United States Patent
Weh et al.

(10) Patent No.: US 11,059,465 B1
(45) Date of Patent: Jul. 13, 2021

(54) PEDAL TRAVEL SIMULATOR

(71) Applicant: Robert Bosch GmbH, Stuttgart (DE)

(72) Inventors: Andreas Weh, Sulzberg (DE); Martin Hagspiel, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/126,951

(22) Filed: Dec. 18, 2020

(30) Foreign Application Priority Data

Feb. 18, 2020 (DE) .......................... 102020201968.1

(51) Int. Cl.
*B60T 8/40* (2006.01)
*F15B 5/00* (2006.01)
*F15B 15/02* (2006.01)

(52) U.S. Cl.
CPC .............. *B60T 8/409* (2013.01); *F15B 5/00* (2013.01); *F15B 15/02* (2013.01)

(58) Field of Classification Search
CPC .......... F15B 15/02; F15B 15/24; B60T 8/409; B60T 7/042
See application file for complete search history.

(56) References Cited

U.S. PATENT DOCUMENTS

| | | | | |
|---|---|---|---|---|
| 9,079,570 B2* | 7/2015 | Sellinger | ............... | B60T 13/573 |
| 9,387,836 B2* | 7/2016 | Ryu | ........................ | B60T 11/18 |
| 10,507,812 B2* | 12/2019 | Weh | ........................ | B60T 7/042 |
| 10,773,697 B2* | 9/2020 | Weh | ........................ | B60T 8/409 |
| 2010/0133897 A1* | 6/2010 | Von Hayn | ............. | B60T 8/4077 |
| | | | | 303/155 |

FOREIGN PATENT DOCUMENTS

WO 2018091195 A1 5/2018

* cited by examiner

*Primary Examiner* — Abiy Teka
(74) *Attorney, Agent, or Firm* — Norton Rose Fulbright US LLP; Gerard Messina

(57) ABSTRACT

To be able to set a spring force of a first simulator spring of a pedal travel simulator of a hydraulic power vehicle braking system, a stroke limiter is provided, which is situated between a simulator piston and the simulator spring, including two rams projecting in opposite directions as stops, which are plastically compressed for setting the spring force. To set a "jump-in," the stroke limiter includes laterally projecting, plastically bendable wings as supports for a second simulator spring, which is situated between the stroke limiter and the simulator piston.

10 Claims, 1 Drawing Sheet

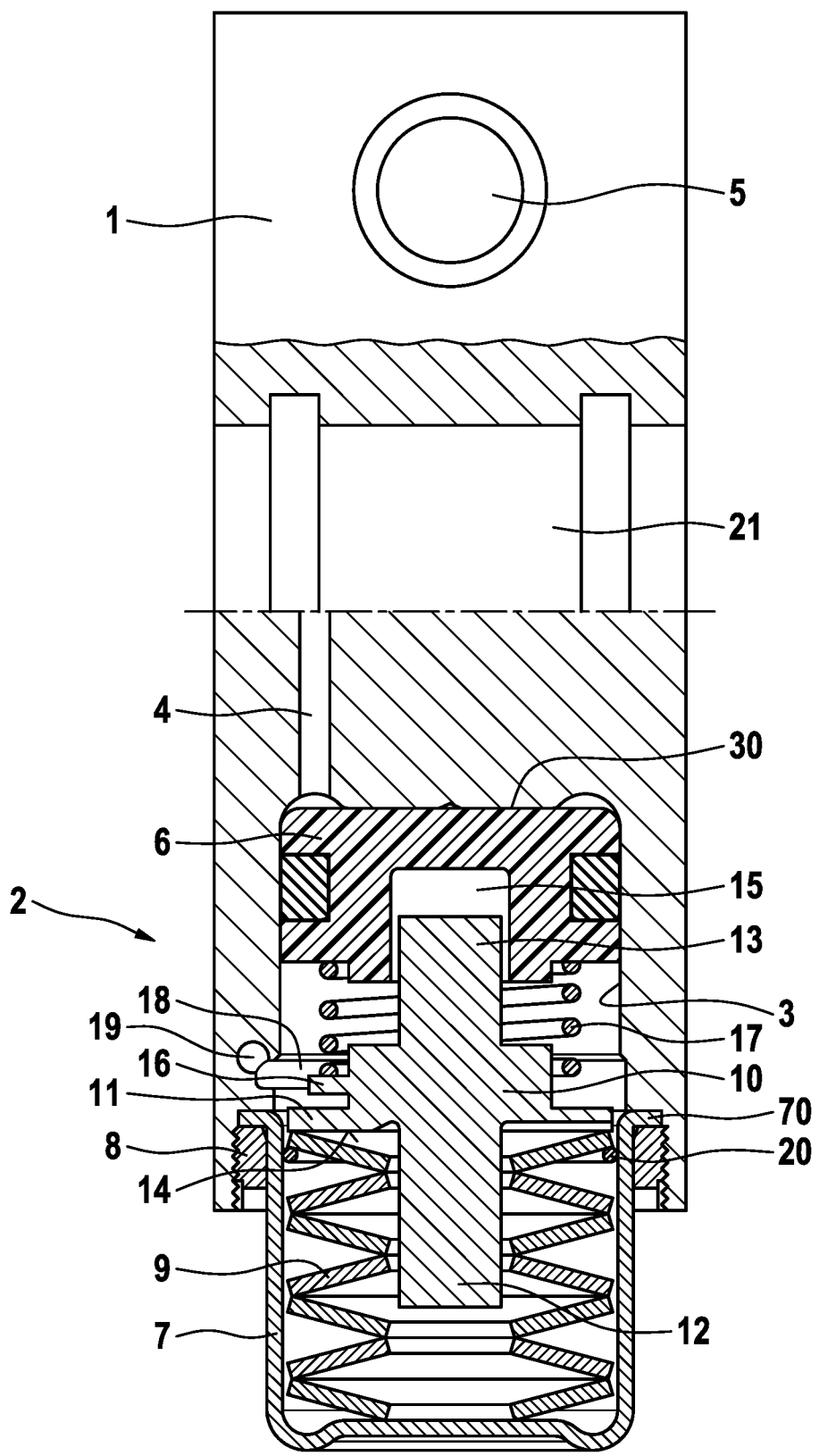

PEDAL TRAVEL SIMULATOR

CROSS REFERENCE

The present application claims the benefit under 35 U.S.C. § 119 of German Patent Application No. DE 102020201968.1 filed on Feb. 18, 2020, which is expressly incorporated herein by reference in its entirety.

FIELD

The present invention relates to a pedal travel simulator.

BACKGROUND INFORMATION

Pedal travel simulators make a pedal travel (a lever travel in the case of a parking brake) possible in power-operated hydraulic vehicle braking systems upon an actuation of a master brake cylinder. With power operation, the master brake cylinder serves as a setpoint generator for a hydraulic braking pressure, which is not generated by the master brake cylinder, but by external energy, for example using a hydraulic pump or a piston-cylinder unit. In the case of power brake application, the master brake cylinder is hydraulically disconnected from the remaining vehicle braking system, for example by the closing of a valve, and upon its actuation displaces brake fluid into the pedal travel simulator which communicates with the master brake cylinder during the power brake application.

A hydraulic block for a power-operated hydraulic vehicle braking system is described in the PCT Patent Application No. WO 2018/091 195 A1. The hydraulic block is a narrow, cuboidal metal block into which a pedal travel simulator is integrated. For this purpose, a cylindrical blind hole is provided in a narrow side of the hydraulic block as a cylinder hole of the pedal travel simulator, in which a simulator piston is accommodated in an axially displaceable manner. The blind hole is closed in a pressure-tight manner with the aid of a cylinder tube-shaped simulator cover which is closed at one end and in which a disk spring assembly is situated as a simulator spring, which acts on the simulator piston in the direction of a base of the cylinder hole in the hydraulic block. A borehole, which in the hydraulic block leads to a master brake cylinder borehole, opens into the base of the cylinder hole. The hydraulic block or an area of the hydraulic block surrounding the cylinder hole forms a simulator cylinder of the pedal travel simulator, which also includes the simulator piston, the simulator spring, and the simulator cover.

SUMMARY

A pedal travel simulator according to an example embodiment of the present invention includes a simulator cylinder, which may, for example, be designed as a cylinder hole in a hydraulic block, and a simulator piston, which is displaceable in the simulator cylinder. A hollow simulator cover closes an open side of the simulator cylinder. The simulator cover is tubular, for example, and has a closed end. The pedal travel simulator according to the present invention furthermore includes two simulator springs and a stroke limiter, which is also displaceable in the simulator cylinder or in the simulator cover. A first of the two simulator springs is situated in the simulator cover and acts on the stroke limiter in the direction of the simulator piston. A second of the two simulator springs, which is preferably weaker than the first simulator spring and, in particular, has only a fraction of a spring force of the first simulator spring, acts on the simulator piston and the stroke limiter to keep them away from one another. The stroke limiter includes a first stop, which protrudes into the simulator cover and limits a displacement travel of the stroke limiter into the simulator cover. In this way, the stroke limiter at the same time also limits a tensioning travel by which the first simulator spring may be maximally deformed, i.e., tensioned. The stroke limiter furthermore includes a second stop, which limits a displacement travel of the simulator piston to the stroke limiter. Together, the first stop and the second stop of the stroke limiter limit a maximum displacement travel of the simulator piston. As soon as the simulator piston rests against the second stop of the stroke limiter, the simulator piston moves together with the stroke limiter and, in the process, tensions the first simulator spring, which conversely applies a spring force onto the simulator piston via the stroke limiter in the direction of a base of the simulator cylinder.

The simulator cylinder is connected or connectable to a master brake cylinder, preferably via a switchable valve, normally a solenoid valve, so that the master brake cylinder, upon its actuation and with the valve open, displaces brake fluid into the simulator cylinder, which moves the simulator piston in the simulator cylinder away from the base of the simulator cylinder and into the simulator cover or in the direction of the closed end of the simulator cover. During a first displacement travel, which is also referred to as "jump-in," the simulator piston tensions the second simulator spring and is displaced toward the stroke limiter until the simulator piston strikes against the second stop of the stroke limiter. The stroke limiter may also move in the process or be stationary. Thereafter, the simulator piston, as described, tensions the first simulator spring via the stroke limiter until maximally the first stop of the stroke limiter strikes against the simulator cover. During the so-called "jump-in," the second simulator spring generates a low actuating force in the master brake cylinder, which corresponds to an actuating force during a muscle power actuation until brake pads at the wheel brakes connected to the master brake cylinder rest against brake disks, brake drums or other brake bodies.

In a preferred embodiment of the present invention, the first stop of the stroke limiter, for setting the displacement travel of the stroke limiter and thus, at the same time, for setting the maximum tensioning travel of the first simulator spring, and/or the second stop of the stroke limiter, for setting a maximum displacement travel of the simulator piston, and/or a second support of the stroke limiter at which the second simulator spring is supported, for setting a preload of the second simulator spring, and thus for setting an actuating force of the master brake cylinder, are plastically deformable during the "jump-in," for example plastically compressible or bendable. Since the first and second stops of the stroke limiter together limit the displacement travel of the simulator piston, the displacement travel of the simulator piston, strictly speaking, is set by the plastic deformation of the two stops.

Refinements and advantageous embodiments of the present invention are described herein.

All features described here and shown in the FIGURES may be implemented in specific embodiments of the present invention either alone or in a generally arbitrary combination. Embodiments of the present invention which do not include all, but only one or multiple features of a claim or of a specific embodiment of the present invention are generally possible.

BRIEF DESCRIPTION OF THE DRAWING

The present invention is described in greater detail hereafter based on one specific embodiment shown in the FIGURE.

The single FIGURE shows a hydraulic block including a pedal travel simulator according to an example embodiment of the present invention cut in an axial plane of the pedal travel simulator.

DETAILED DESCRIPTION OF EXAMPLE EMBODIMENTS

The FIGURE shows a hydraulic block 1 including a pedal travel simulator 2 according to the present invention. Hydraulic block 1 is provided for a slip regulation and a power operation of a hydraulic power vehicle braking system, which is incidentally not shown. Hydraulic block 1 is a cuboid-shaped metal block which, with the exception of a pedal travel simulator 2 according to the present invention to be described, is shown unequipped. In the shown and described specific embodiment, hydraulic block 1 is made up of light metal, namely of an aluminum alloy. Hydraulic block 1 has boreholes corresponding to a hydraulic diagram of a vehicle braking system, which are not visible in the drawing. It is equipped with hydraulic components for power operation, which are not shown, and the slip regulation, such as solenoid valves, a master brake cylinder including one or multiple piston(s), a power cylinder including a power piston, and pedal travel simulator 2, which are hydraulically connected corresponding to the hydraulic diagram of the vehicle braking system via the boreholes. Since a master brake cylinder is integrated into hydraulic block 1, only hydraulic wheel brakes have to be connected to hydraulic block 1 via brake lines. Such hydraulic blocks 1 are known and are not discussed in greater detail here.

Hydraulic block 1 includes a cylindrical blind hole serving as simulator cylinder 3 of pedal travel simulator 2 according to the present invention, at whose base 30 a borehole opens as connection 4 for the master brake cylinder. The borehole forming connection 4 hydraulically connects simulator cylinder 3 of pedal travel simulator 2 to a master brake cylinder borehole 5 into which a master brake cylinder, which is not shown, or a master brake cylinder bushing, is pressed, or master brake cylinder borehole 5 forms the master brake cylinder.

A simulator piston 6 is accommodated in an axially displaceable manner in simulator cylinder 3.

A simulator cover 7, which projects from hydraulic block 1, is inserted into an annular step in an opening at an open end of simulator cylinder 3 of pedal travel simulator 2. In the exemplary embodiment, simulator cover 7 is a deep-drawn part made of sheet metal, it is cylinder tube-shaped and has an open end facing simulator cylinder 3 and a closed end. A threaded ring 8, which is screwed into an internal thread in the opening of simulator cylinder 3, holds simulator cover 7 in the manner of a union nut at a flange 70 at the open end of simulator cover 7.

A disk spring assembly is situated in simulator cover 7 as first simulator spring 9, which is supported at the closed end of simulator cover 7. A spring other than the disk spring assembly, for example a helical compression spring, is possible as the first simulator spring (not shown).

A stroke limiter 10, which includes a circular disk-shaped flange 11 from which pin-shaped rams project axially on both sides as stops 12, 13, is situated between simulator piston 6 and first simulator spring 9. A first of the two stops 12 projects in the direction of the closed end of simulator cover 7 and extends through center holes of the disk spring assembly forming first simulator spring 9. During a displacement of stroke limiter 10 in the direction of the closed end of simulator cover 7, first stop 12 strikes against the closed end of simulator cover 7, and thereby limits a displacement travel of stroke limiter 10 in this direction.

The disk spring assembly forming first simulator spring 9 rests against flange 11 of stroke limiter 10, which forms a first support 14 for first simulator spring 9. First stop 12, which limits the displacement travel of stroke limiter 10, at the same time also limits a tensioning travel by which first simulator spring 9 is elastically axially compressible, i.e., tensionable. This prevents a compression of first simulator spring 9 "to full contact" until the disk springs rest flat against one another or, for example in the case of a helical compression spring as the first simulator spring, until spring windings rest against one another, and/or a plastic deformation of first simulator spring 9.

Second stop 13 projects from flange 11 of stroke limiter 10 in the direction of simulator piston 6 and protrudes into a coaxial counterbore 15 of simulator piston 6. When simulator piston 6, as shown, rests at base 30 of simulator cylinder 3, a distance exists between second stop 13 of stroke limiter 10 and the base of counterbore 15 in simulator piston 6, so that simulator piston 6 has limited mobility with respect to stroke limiter 10. When simulator piston 6 rests against second stop 13 of stroke limiter 10, stroke limiter 10 and simulator piston 6 move together during a further displacement of simulator piston 6, and simulator piston 6 via stroke limiter 10 compresses first simulator spring 9, i.e., simulator piston 6 tensions first simulator spring 9 when simulator piston 6 rests against second stop 13 of stroke limiter 10. A displacement travel of simulator piston 6 is limited by it resting against second stop 13 of stroke limiter 10 and by first stop 12 of stroke limiter 10 resting against the closed end of simulator cover 7.

Offset from flange 11 in the direction of simulator piston 6, stroke limiter 10 includes three wings, which are distributed over a circumference and project outwardly in a radial plane, as a second support 16, at which a helical compression spring is supported as second simulator spring 17, which pushes simulator piston 6 and stroke limiter 10 apart. Second simulator spring 17, which does not have to be a helical spring, is considerably weaker than first simulator spring 9 and has only a fraction of a spring force of first simulator spring 9. Second simulator spring 17 acts on simulator piston 6 until it rests against second stop 12 of stroke limiter 10. It simulates a so-called "jump-in," i.e., a low actuating force of the master brake cylinder until brake pads of wheel brakes of the vehicle braking system rest against brake disks, brake drums or other brake bodies.

A spring force of second simulator spring 17 is approximately 30 N, while a spring force of first simulator spring 9 is approximately 3.2 kN at a brake pressure of 50 bar, approximately 8.3 kN at a brake pressure of 130 bar, and approximately 32 kN when first stop 12 of stroke limiter 10 rests against the closed end of simulator cover 7, which corresponds to a brake pressure of up to 420 bar. The maximum value is normally not reached in practice; it would require a foot force of approximately 3 kN at a brake pedal, which at a mechanical leverage ratio at the brake pedal of 4 would result in a rod force of 12 kN on a master brake cylinder brake piston. At a realistic foot force of no more than 1 kN, the values reach approximately one third of the maximum values. The aforementioned pressures and forces apply to an exemplary embodiment of pedal travel simulator 2 according to the present invention; other values are possible.

According to an example embodiment of the present invention, the displacement travel of stroke limiter 10, and thus at the same time the tensioning travel of first simulator spring 9, is set by plastic deformation, namely plastic compression of first stop 12 of stroke limiter 10. Thereafter, the maximum displacement travel of simulator piston 6 is set, also by plastic deformation, namely plastic compression of second stop 13 of stroke limiter 10. First stop 12 is compressed prior to second stop 13 since the displacement travel of simulator piston 6 is dependent on a length of both stops 12, 13 or a length of stroke limiter 10. By plastic deformation, namely plastic bending of the wings forming second support 16 and projecting laterally from stroke limiter 10 in the direction of simulator piston 6, or away from same, a preload of second simulator spring 17, and thus its spring force, is set. After the compression of first stop 12 of stroke limiter 10, support 16 is bent since the preload of second simulator spring 17 is also dependent on the length of first stop 12. It does not matter whether support 16 is bent before or after the compression of second stop 13.

To ensure that brake fluid is able to flow out of a rear side of simulator piston 6 facing away from base 30 of simulator cylinder 3, and out of simulator cover 7, during the displacement of simulator piston 6 in simulator cylinder 3, simulator cylinder 3 includes a groove 18 into which a relief borehole 19 opens. Flange 11 of stroke limiter 10 has a smaller diameter than an inside diameter of simulator cover 7, so that brake fluid may flow past flange 11.

Near the open side of simulator cover 7, a spring washer 20 is situated in simulator cover 7, which rests with preload against the inside of simulator cover 7 and holds in simulator cover 7 in a clamping manner. Spring washer 20 extends over flange 11 of stroke limiter 10 and, in this way, during an assembly of pedal travel simulator 2, holds stroke limiter 10 and the disk spring assembly forming first simulator spring 9 in simulator cover 7 until it has been situated in the opening of simulator cylinder 3.

Outside master brake cylinder borehole 5, hydraulic block 1 includes a power cylinder borehole 21 in which a power piston, which is not shown, is electromechanically displaceable with the aid of an electric motor, which is also not shown, via a helical gear for generating a brake pressure using power. A service brake application takes place as a power brake application during which a brake pressure is generated by the power piston, which is not shown. During the power brake application, the master brake cylinder is hydraulically disconnected from the remaining vehicle braking system by the closing of separating valves, and is connected to simulator cylinder 3 of pedal travel simulator 2 according to the present invention by an opening of a simulator valve, so that brake fluid may be displaced out of the master brake cylinder into simulator cylinder 3.

Power cylinder borehole 21 is situated outside the cutting plane of simulator cylinder 3 and is shown as a half section. Connection 4 of simulator cylinder 3 leads past power cylinder borehole 21.

What is claimed is:

1. A pedal travel simulator for a hydraulic power vehicle braking system, comprising:
a simulator cylinder;
a simulator piston which is displaceable in the simulator cylinder;
a hollow simulator cover which closes the simulator cylinder;
a first simulator spring which is situated in the simulator cover;
a second simulator spring; and
a stroke limiter for the simulator piston, the stroke limiter being movable in a displacement direction of the simulator piston and is acted on by the first simulator spring in a direction of the simulator piston, the stroke limiter including a first support for the first simulator spring, a second support for the second simulator spring which acts on the simulator piston and the stroke limiter to keep them away from one another, a first stop protruding into the simulator cover which limits a displacement travel of the stroke limiter into the simulator cover and, at the same time, a tensioning travel of the first simulator spring, and a second stop which limits a displacement travel of the simulator piston toward the stroke limiter.

2. The pedal travel simulator as recited in claim 1, wherein the first stop, for setting the displacement travel of the stroke limiter, and/or the second stop, for setting a displacement travel of the simulator piston, and/or the first support and the second support, for setting a preload of the second simulator spring, is adjustable in the displacement direction.

3. The pedal travel simulator as recited in claim 1, wherein the first stop, for setting the displacement travel of the stroke limiter, and/or the second stop, for setting a displacement travel of the simulator piston, and/or the first support and the second support, for setting a preload of the second simulator spring, is adjustable in the displacement direction by plastic deformation.

4. The pedal travel simulator as recited in claim 1, wherein the first stop and/or the second stop is rod-shaped and plastically compressible.

5. The pedal travel simulator as recited in claim 1, wherein the second support includes wings distributed over a circumference, at which the second simulator spring is supported and which are plastically bendable in the displacement direction.

6. The pedal travel simulator as recited in claim 1, wherein the first simulator spring has a greater spring force than the second simulator spring.

7. The pedal travel simulator as recited in claim 1, wherein a radially spring-loaded securing element is situated with radial preload in the simulator cover, which holds the first simulator spring and the stroke limiter in the simulator cover.

8. A hydraulic block including a pedal travel simulator for a hydraulic power vehicle braking system, the pedal travel simulator including a simulator cylinder, a simulator piston which is displaceable in the simulator cylinder, a hollow simulator cover which closes the simulator cylinder, a first simulator spring which is situated in the simulator cover, a second simulator spring, and a stroke limiter for the simulator piston, the stroke limiter being movable in a displacement direction of the simulator piston and is acted on by the first simulator spring in a direction of the simulator piston, the stroke limiter including a first support for the first simulator spring, a second support for the second simulator spring which acts on the simulator piston and the stroke limiter to keep them away from one another, a first stop protruding into the simulator cover which limits a displacement travel of the stroke limiter into the simulator cover and, at the same time, a tensioning travel of the first simulator spring, and a second stop which limits a displacement travel of the simulator piston toward the stroke limiter;

wherein the simulator cylinder is a hole in the hydraulic block.

9. A method for setting a displacement travel of a simulator piston a pedal travel simulator for a hydraulic power vehicle braking system, the pedal travel simulator including a simulator cylinder, a simulator piston which is displaceable in the simulator cylinder, a hollow simulator cover which closes the simulator cylinder, a first simulator spring which is situated in the simulator cover, a second simulator spring, and a stroke limiter for the simulator piston, the stroke limiter being movable in a displacement direction of the simulator piston and is acted on by the first simulator spring in a direction of the simulator piston, the stroke limiter including a first support for the first simulator spring, a second support for the second simulator spring which acts on the simulator piston and the stroke limiter to keep them away from one another, a first stop protruding into the simulator cover which limits a displacement travel of the stroke limiter into the simulator cover and, at the same time, a tensioning travel of the first simulator spring, and a second stop which limits a displacement travel of the simulator piston toward the stroke limiter, the method comprising:
  plastically deforming the first stop for setting the tensioning travel of the first simulator spring; and
  plastically deforming the second stop for setting the displacement travel of the simulator piston.

10. A method for setting a jump-in of a pedal travel simulator for a hydraulic power vehicle braking system, the pedal travel simulator including a simulator cylinder, a simulator piston which is displaceable in the simulator cylinder, a hollow simulator cover which closes the simulator cylinder, a first simulator spring which is situated in the simulator cover, a second simulator spring, and a stroke limiter for the simulator piston, the stroke limiter being movable in a displacement direction of the simulator piston and is acted on by the first simulator spring in a direction of the simulator piston, the stroke limiter including a first support for the first simulator spring, a second support for the second simulator spring which acts on the simulator piston and the stroke limiter to keep them away from one another, a first stop protruding into the simulator cover which limits a displacement travel of the stroke limiter into the simulator cover and, at the same time, a tensioning travel of the first simulator spring, and a second stop which limits a displacement travel of the simulator piston toward the stroke limiter, the method comprising:
  plastically deforming the first stop for setting the tensioning travel of the first simulator spring; and
  plastically deforming the first support and/or the second support for setting the jump-in.

* * * * *